United States Patent
Rosenschein et al.

(10) Patent No.: US 6,341,306 B1
(45) Date of Patent: Jan. 22, 2002

(54) WEB-BASED INFORMATION RETRIEVAL RESPONSIVE TO DISPLAYED WORD IDENTIFIED BY A TEXT-GRABBING ALGORITHM

(75) Inventors: Bob Rosenschein, Jerusalem; Jeff Schneiderman, Ma'ale Michmas; Daniel Brief; Naama Bamberger, both of Jerusalem; Gil Reich, Eli; Uri Bernstein, Jerusalem; Tamar Rosen, Jerusalem; Asher Szmulewicz, Jerusalem, all of (IL)

(73) Assignee: Atomica Corporation, Burlingame, CA (US)

( * ) Notice: Subject to any disclaimer, the term of this patent is extended or adjusted under 35 U.S.C. 154(b) by 0 days.

(21) Appl. No.: 09/374,478

(22) Filed: Aug. 13, 1999

(51) Int. Cl.⁷ .............................................. G06F 17/30
(52) U.S. Cl. ........................ 709/217; 705/14; 345/145; 345/326
(58) Field of Search ................................. 709/200, 201, 709/203, 217, 218, 219; 705/14; 345/326, 335, 145

(56) References Cited

U.S. PATENT DOCUMENTS

| | | |
|---|---|---|
| 5,706,502 A | 1/1998 | Foley et al. |
| 5,710,918 A | 1/1998 | Lagarde et al. |
| 5,793,964 A | 8/1998 | Rogers et al. |
| 5,808,613 A | 9/1998 | Marrin et al. |
| 5,884,056 A | 3/1999 | Steele |
| 5,913,033 A | 6/1999 | Grout |
| 5,974,441 A | 10/1999 | Rogers et al. |
| 5,982,370 A * | 11/1999 | Kamper |
| 6,032,196 A * | 2/2000 | Monier |
| 6,049,821 A * | 4/2000 | Theriault et al. |
| 6,138,150 A * | 10/2000 | Nichols et al. |

* cited by examiner

Primary Examiner—Dung C. Dinh
(74) Attorney, Agent, or Firm—Abelman, Frayne & Schwab

(57) ABSTRACT

A method for retrieving information, including designating at least one word appearing in a display of a body of text generated by a first computer. Responsive to the designation, the at least one designated word is automatically transmitted via a network to a second computer. Data relating to the at least one designated word are received from the second computer.

10 Claims, 3 Drawing Sheets

Microfiche Appendix Included
(2 Microfiche, 185 Pages)

WEB-BASED INFORMATION RETRIEVAL RESPONSIVE TO DISPLAYED WORD IDENTIFIED BY A TEXT-GRABBING ALGORITHM

MICROFICHE APPENDIX

A computer printout is attached hereto in microfiche form and is incorporated herein by reference. The printout comprises executable program files in hexadecimal format. This appendix includes 2 microfiches, containing a total of 185 frames.

FIELD OF THE INVENTION

The present invention relates generally to data processing, and specifically to information retrieval.

BACKGROUND OF THE INVENTION

Many text-processing applications available today enable users to look up information about a selected word on a computer display. For example, Microsoft Word enables a user to click on a word, and to see thesaurus or dictionary entries related to the word. In order to retrieve this information, Microsoft Word accesses a fixed, local database stored on a CD-ROM or on the computer's hard disk.

A large number of search engines on the World-Wide-Web provide a list of hyperlinks to sites related to a user's typed query. Typically, the user goes to the search engine's own site, and subsequently types or copies-and-pastes one or more words of interest into a text-input box displayed by the engine.

Other software, such as TechnoCraft's RoboWord, Mashov Software's Babylon, and Accent Software's WordPoint, allows a user to click on a word and see a translation of the word into a second language. One or more electronic dictionaries are provided with these packages, and are stored on the user's computer.

Connect Innovation's software package FlySwat appears in a sidebar next to a Web browser running on a user's computer. FlySwat looks at text downloaded by the browser, and continually accesses and displays data from and hyperlinks to other Web sites deemed relevant by FlySwat.

SUMMARY OF THE INVENTION

It is an object of some aspects of the present invention to provide improved methods and apparatus for obtaining information from a database.

It is a further object of some aspects of the present invention to provide improved apparatus and methods for obtaining through the Internet.

In preferred embodiments of the present invention, a user of a client computer retrieves information from a server, which is coupled to the client by a network. The user designates at least one word in a body of text which is shown on a display of the client, and the client automatically transmits the designated word over the network to the server. The server processes the word and transmits data relating thereto to the client. "Designating" a word, in the context of the present patent application, means indicating a word on a display, typically with a pointing device, but alternatively or additionally with a key sequence (such as CTRL-ALT-?) applied to a marked word or to a word containing or adjacent to the cursor, whereby the user does not type the word to designate it, and whereby the user does not copy-and-paste the word from one window to a second window.

In general, the server does not have access to the body of text prior to the user's designation of the word. Moreover, the designated word typically does not have a hyperlink associated therewith, and is generally a word in a natural language (e.g., English). Words in a "natural language" are to be understood as plain words, e.g., "Clinton," "California," or "stock market," and not as words associated with causing a computer to perform an instruction, such as "www.buy4mom.com" or "172.14.7.2." Thus, substantially any text (e.g., the name of a program on the Windows desktop), or file containing text, (e.g., a piece of received e-mail, a Web page, or a just-created word-processor document), is appropriate for use in the practice of embodiments of the present invention. Typically, the user designates the word simply by pointing with a pointing device (e.g., a mouse) at the word on the display, and then right-clicking on the desired word, possibly selecting a "retrieve information" option from a right-click menu. Responsive thereto, the client transmits the word to the server, which automatically retrieves data from a database and transmits the data to be displayed on the client's display.

Embodiments of the invention can be viewed in contrast to methods of information-retrieval from a remote source known in the art, in which: (a) only a limited number of words in a document are provided with options for further information-retrieval, e.g., by hyperlinking, or (b) the user must open a new window, e.g., a search engine or an electronic encyclopedia, and re-type or copy-and-paste the desired word from the user's document to a text-entry line in the new window.

In some preferred embodiments of the present invention, data transmitted to the client comprise an advertisement, a promotional message, a hyperlink to a related Web site, or electronic commerce data, e.g., price data related to a commercial product, which are selected by the server for transmission to the client responsive to the user's designated word.

Typically, the network comprises the Internet, and may alternatively or additionally comprise an intranet, for example, a corporate intranet. A server on a corporate intranet preferably maintains a database of corporate information for distribution to client computers connected to the intranet server, and additionally enables information to be retrieved from external servers, for example, through the Internet, using principles of the present invention.

In some preferred embodiments of the present invention, the display comprises a television, for example, a Web-TV, showing television programming which includes text on the display. The user points to a word in the text with a pointing device, and additional information related thereto is retrieved from the server. Typically, although not necessarily, the server is not related to the producers of the text.

In a preferred embodiment, a first portion of the data is displayed in a first region of the display, and a second portion of the data is displayed in a second region of the display. Typically, a small quantity of data is shown in a small window, which opens adjacent to the designated word and closes automatically. A larger quantity of data, e.g., including hyperlinks and graphics, is shown in a second, interactive, window. Alternatively or additionally, for example, text and graphics may be shown in respective windows. Further alternatively or additionally, words may be shown in one window, and columns of numbers may be shown in another window.

In some preferred embodiments of the present invention, one or more context-indicating words are drawn from the body of text and transmitted with the designated word to the server. Alternatively, some or all of the body of text is transmitted to the server, which extracts the context-indicating words therefrom. The server evaluates the designated word in the context of the context-indicating words, and transmits data from the database responsive to the evaluation. Typically, some of the context-indicating words are drawn from the same sentence as that including the designated word, to enable a grammatical and/or linguistic analysis of the designated word, and, preferably, to sharply define the context of the designated word. For example, "stock" next to "broker" is highly likely to have a different meaning from "stock" next to "barrel." Alternatively or additionally, some of the context-indicating words are drawn from elsewhere in the body of text, preferably including from a title of the body of text. Further alternatively or additionally, document analysis and/or document categorization techniques known in the art are used to determine significant content in the body of text, and to generate thereby the context-indicating words.

Preferably, at least some of the data transmitted by the server to the client are drawn from a dynamically-changing database, and may include, for example, financial, sports, weather, or news data related to the designated word. Alternatively or additionally, the data include standard reference information, such as a dictionary definition, a translation of the designated word into a second language, a set of synonyms from a thesaurus, or an encyclopedia entry.

In some preferred embodiments of the present invention, a text-grabbing algorithm and/or an optical character recognition (OCR) algorithm, are executed by the client computer to determine the word designated by the user. In a "text-grabbing" algorithm, as used in the context of the present patent application, the client computer, knowing the position indicated by the pointing device, assesses instructions executed by a program running on the client, in order to determine text which was placed by the program on the display at the known position.

In some preferred embodiments of the present invention, the server establishes communities of users having similar interests, responsive to their designated words. Typically, the user communities are enabled by server-based chat groups, which optionally display links to Web pages suggested by community members.

In other preferred embodiments of the present invention, a browser or other software running on the client computer displays text, some of which is hyperlinked to a Web site maintained by a host. Preferably, the user right-clicks on a desired hyperlink, and chooses a "look-before-you-link" option from a right-click menu, to cause the client computer to retrieve a small amount of information from the Web page specified by the hyperlink, and to display the retrieved information in a transient window near the designated link. In order to achieve fast retrieval from the remote host, the displayed information typically comprises a relatively small amount of text from the designated Web page, and generally does not have any graphical components. The specific data selected for retrieval may comprise, for example, the title and first few sentences or paragraphs of the designated Web page.

Alternatively, the client downloads part or all of the text from the remote server, and displays only those portions of the retrieved text having generally the same context as the paragraph containing the hyperlink clicked by the user.

There is therefore provided, in accordance with a preferred embodiment of the present invention, a method for retrieving information, including:

designating at least one word appearing in a display of a body of text generated by a first computer;

responsive to the designation, automatically transmitting the at least one designated word via a network to a second computer; and receiving data relating to the at least one designated word from the second computer.

Typically, the body of text is not stored by the second computer, and the at least one designated word does not have a hyperlink directly associated therewith.

Preferably, receiving the data includes receiving data generated automatically by the second computer responsive to the transmission of the at least one designated word.

Further preferably, the data include electronic commerce data, an advertisement, and/or a hyperlink, selected responsive to the at least one designated word.

Still further preferably, the network includes the Internet or an intranet.

Typically, the display includes a display of a computer, preferably of the first computer. Alternatively or additionally, the display shows a television program, and the body of text is generated responsive to content of the program.

In a preferred embodiment, the method includes displaying a first portion of the data having a first quality in a first region of the display, and displaying a second portion of the data having a second quality in a second region of the display.

Alternatively or additionally, the data include video and/or audio data.

Further alternatively or additionally, designating includes receiving a designation made by a user, and receiving the data includes the user receiving a request for a hyperlink to a site preferred by the user.

Preferably, designating includes receiving a designation made by a first user, and receiving the data includes receiving an offer to enable communications between the first user and a second user responsive to the at least one designated word. Further preferably, the communications include a chat group.

Preferably, the method includes transmitting a context-indicating word, drawn from the body of text, and receiving data includes receiving data responsive to the context-indicating word. In a preferred embodiment, the context-indicating word includes a plurality of context-indicating words. Preferably, the context-indicating word is selected responsive to a grammatical analysis of a sentence including the at least one designated word. Alternatively or additionally, the context-indicating word is drawn from a position in the body of text non-adjacent to the at least one designated word. For example, the context-indicating word may be drawn from a document title associated with the body of text. Alternatively or additionally, the context-indicating word may be drawn from a different sentence in the body of text from a sentence including the at least one designated word.

Preferably, the data include dynamic data, drawn from a dynamically-changing database responsive to the at least one designated word. Further preferably, the dynamic data include financial data, sports data, weather data, and/or a weather report.

Alternatively or additionally, the data include reference information responsive to the at least one designated word. In a preferred embodiment, the reference information includes a thesaurus entry, an encyclopedia entry, and/or a dictionary entry, responsive to the at least one designated word.

Preferably, designating includes designating with a pointing device. Further preferably, designating includes causing execution of a text-grabbing algorithm or an optical character recognition algorithm to identify the at least one word.

In a preferred embodiment, a World Wide Web page displayed by a browser program includes the body of text, and designating includes causing execution of an algorithm which accesses instructions executed by the browser program in order to identify the at least one word.

There is also provided, in accordance with a preferred embodiment of the present invention, a method for providing information, including:

providing a program routine to a host computer, which transmits to a server via a network at least one word designated in a body of text shown on a display of the host computer, the transmission being executed automatically responsive to the designation, wherein the body of text is not generated by the server;

receiving the at least one transmitted word at the server; and transmitting from the server to the host computer data relating to the at least one transmitted word.

Preferably, transmitting the data from the server includes transmitting data generated automatically by the server responsive to receiving the at least one transmitted word.

In a preferred embodiment, transmitting data from the server includes transmitting a request for a hyperlink to a preferred site. Typically, the at least one word is designated by a first user, and transmitting data from the server includes transmitting an offer to enable communications between the first user and a second user responsive to the at least one designated word.

Preferably, the method includes receiving from the host computer a context-indicating word, drawn from the body of text, wherein transmitting data from the server includes transmitting data responsive to the context-indicating word.

Further preferably, providing the program routine includes causing the host computer to execute a text-grabbing algorithm and/or an optical character recognition algorithm to identify the at least one word.

In a preferred embodiment, a World Wide Web page displayed by a browser program running on the host computer includes the body of text, and providing the program routine includes causing the host computer to execute an algorithm which accesses instructions executed by the browser program in order to identify the at least one word.

There is further provided, in accordance with a preferred embodiment of the present invention, a method for providing information, including:

contracting with one or more advertisers having respective fields of business to provide promotional data to users of a network regarding the fields of business;

receiving from a host via the network at least one word designated by one of the users, the word being in a natural language in a body of text shown on a display of the host and transmitted by the host automatically responsive to the designation;

determining that the at least one designated word relates to a given one of the fields of business; and transmitting to the host the promotional data regarding the given field of business.

Preferably, the promotional data include electronic commerce data and/or dynamic data, drawn from a dynamically-changing database, selected responsive to the at least one designated word.

Further preferably, the method includes receiving from the host a context-indicating word, drawn from the body of text, wherein transmitting promotional data to the host data includes transmitting responsive to the context-indicating word.

There is still further provided, in accordance with a preferred embodiment of the present invention, a computer program product for retrieving information, the program having computer-readable program instructions embodied therein, which instructions are read by a host computer, causing the computer to automatically transmit via a network to a second computer at least one word that is designated on a display of the host computer in a body of text generated by a source other than the second computer, and to receive and display data relating to the at least one designated word from the second computer.

There is also provided, in accordance with a preferred embodiment of the present invention, a system for providing information to a host, the system including:

a network; and a server, which receives via the network at least one word that is designated in a body of text shown on a display of the host, the at least one designated word being transmitted from the host to the server automatically responsive to the designation, and transmits to the host data relating to the at least one transmitted word, wherein the body of text is not generated by the server.

There is further provided, in accordance with a preferred embodiment of the present invention, a method for simplifying retrieval of information from a database, including:

designating a word in a body of text shown on a display; and automatically retrieving the information from the database, responsive to the designation and responsive to a context-indicating word in the body of text.

There is still further provided, in accordance with a preferred embodiment of the present invention, a method for retrieving information, including:

designating a hyperlink corresponding to a Web page at a remote site;

defining an information-retrieval criterion;

retrieving natural-language text from the remote site responsive to the designation; and automatically displaying a portion of the retrieved text responsive to the information-retrieval criterion.

Preferably, defining the criterion includes specifying a quantity of the text and/or specifying at least one context-indicating word in a document including the hyperlink. In a preferred embodiment, displaying the portion of the retrieved text includes displaying an automatically-generated summary of the text.

The present invention will be more fully understood from the following detailed description of the preferred embodiments thereof, taken together with the drawings, in which:

DETAILED DESCRIPTION OF PREFERRED EMBODIMENTS

Figure 1:
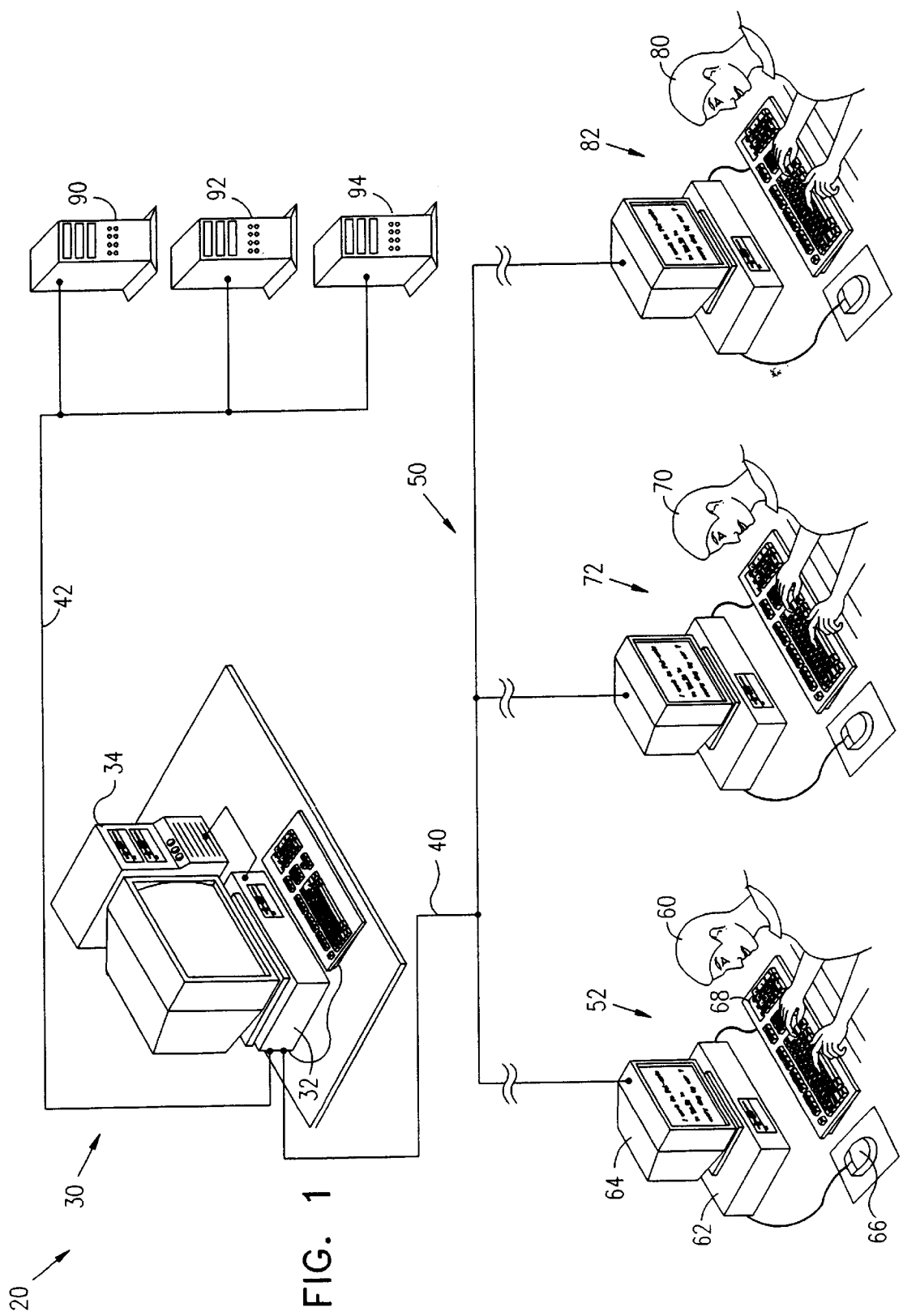
FIG. 1 is a schematic illustration of information retrieval apparatus, in accordance with a preferred embodiment of the present invention.

FIG. 1 is a schematic illustration of information retrieval apparatus 20, which enables a user 60 of a client computer 52 to access information from a server 30 through a network 40, in accordance with a preferred embodiment of the present invention. Server 30 comprises a processor 32, which processes an information-retrieval request from client 52. Responsive to the processing, the server typically retrieves data from a database 34 at the server's site and transmits the data to client 52. Alternatively or additionally, server 30 retrieves the data through a network 42 from one or more remote servers and/or databases 90, 92, and 94.

Client 52 preferably comprises a processor 62, a display 64, a keyboard 68, and a pointing device 66. Pointing device 66 typically comprises a mouse, but may, alternatively or additionally, comprise a track-ball, joystick, digitizing pad, touch screen, or keyboard 68. Client 52 may comprise substantially any electronic device capable of presenting text for a user to view. As appropriate, client 52 may comprise, for example, a desktop computer, a personal digital assistant (PDA) which communicates via a wireless network, or a television.

Figure 2:
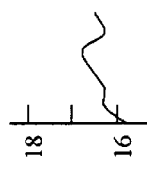
FIG. 2 is a sample display, generated during use of the apparatus of FIG. 1, in accordance with a preferred embodiment of the present invention.
Figure 2:
Figure 3:
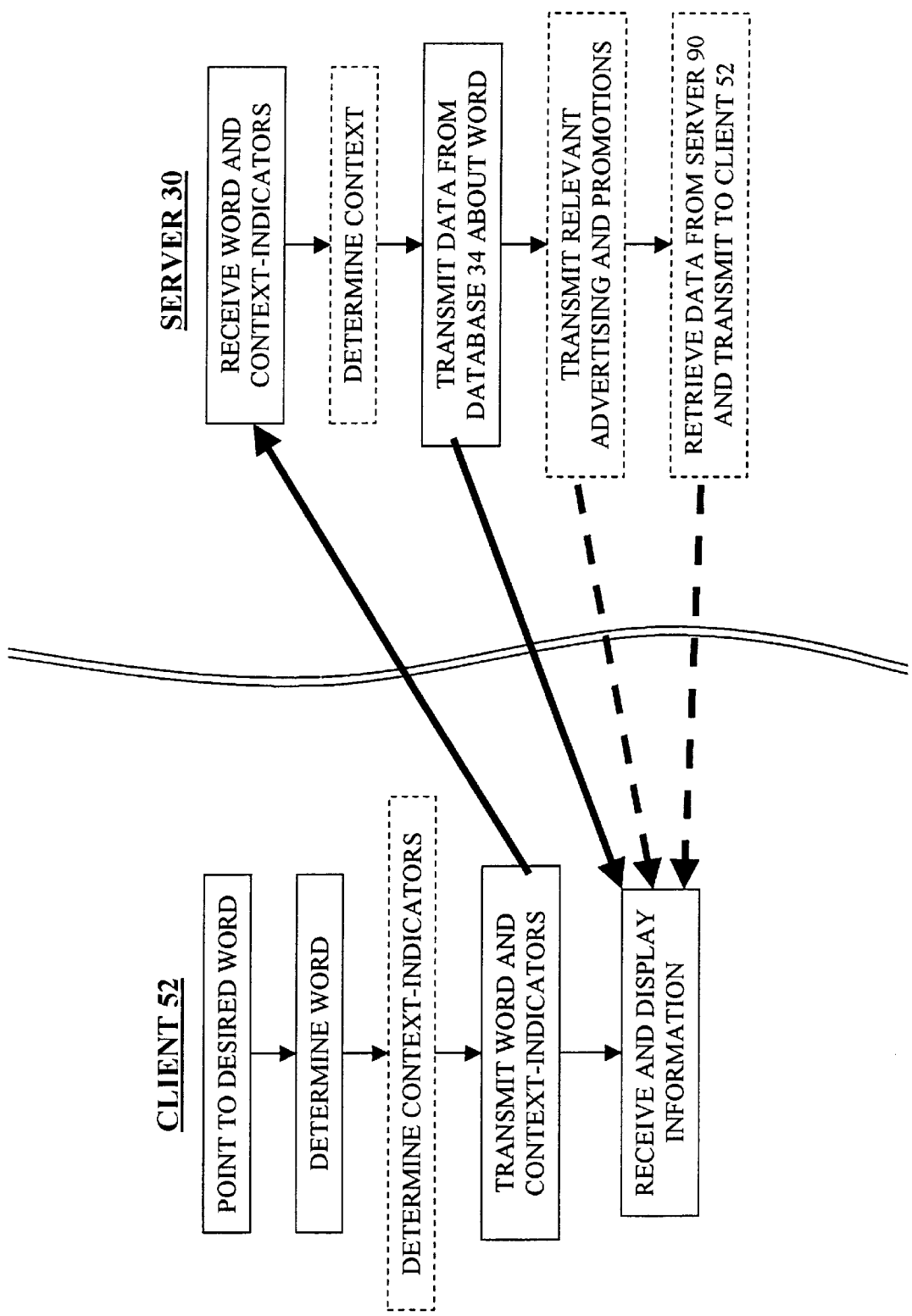
FIG. 3 is a flow chart showing processing steps executed by the apparatus of FIG. 1, in accordance with a preferred embodiment of the present invention.

Reference is now made to FIGS. 2 and 3. FIG. 2 is a sample output of display 64, generated during use of apparatus 20, in accordance with a preferred embodiment of the present invention. FIG. 3 is a flow chart showing processing steps executed by apparatus 20 in generating the output shown in FIG. 2, in accordance with a preferred embodiment of the present invention. In FIG. 2, user 60 has designated the word "flowers" with pointing device 66, by placing an arrow pointer on the word, and, for instance, right-clicking, to indicate to client 52 that additional information is desired about flowers. Alternatively, user 60 may place the arrow pointer on the word and wait a specified amount of time, to indicate that further information is desired about the designated word. Further alternatively, user 60 may designate the word by using a key sequence, such as CTRL-ALT-?, applied when the cursor is anywhere within the desired word. Client 52 automatically transmits the designated word over network 40 to server 30. Server 30 processes the word and transmits data relating thereto to the client.

The data typically include reference information, such as, by way of illustration and not limitation, a dictionary definition (as shown in FIG. 2), a translation of the designated word into a second language, a set of synonyms from a thesaurus, or an entry from an encyclopedia, a "who's who" list, or an almanac.

Server 30 may also transmit an advertisement related to the designated word, preferably with a hyperlink to the advertiser's Web page. In a preferred embodiment, some current information, for example, the number of flower purchases made that day, is retrieved via network 42 from the advertiser's Web site. Additionally, the data may comprise a promotional message, a hyperlink to a related Web site, or electronic commerce data, e.g., price data related to a commercial product, which are selected by server 30 for transmission to client 52, responsive to user 60's designated word.

Preferably, database 90 has dynamically-changing data contained therein, and at least some of the data sent to client 52 are drawn from database 90. Depending on the designated word, the dynamic data may include, for example, financial, sports, weather, or news data. In FIG. 2, responsive to user 60 designating the word "flower," server 30 retrieves from database 90 a current stock-quote and a record of the day's trading for FLW, a fictitious company trading on the NYSE.

Typically, database 34 maintains a large number of links and other information relevant to words which might at some point be designated by a user. Subsequently, upon designation of a particular word server 30 assembles from one or more of the databases the pre-planned information for transmission to client 52. In tests performed by the inventors, the total time from designation by the user until a complete set of information is received through the Internet at the client is typically not more than several seconds.

In a preferred embodiment, data transmitted to client 52 comprise video or audio data, responsive to the designated word. For example, a window may open and show news footage of the Philadelphia Flower Show, or Disney's historic film, "Flowers and Trees."

In general, server 30 does not have access to the body of text prior to user 60's designation of the word. Thus, substantially any text on display 64, or any file containing text, for instance, a piece of received e-mail (as in FIG. 2), a Web page, or a just-created word-processor document, is appropriate for use in the practice of embodiments of the present invention. Additionally, no pre-processing of the body of text is typically performed prior to the user's designation.

Typically, although not necessarily, networks 40 and 42 comprise the Internet. Alternatively or additionally, the networks comprise an intranet, for example, a corporate intranet. A server on a corporate intranet preferably maintains a database of corporate information for distribution to client computers connected to the intranet server, and additionally enables information to be retrieved from external servers, for example, through the Internet, using principles of the present invention, as described herein.

In some preferred embodiments, display 64 comprises a television, for example, a Web-TV, showing television programming which includes text on the display. User 60 points to a word in the text with a pointing device, and additional information related thereto is retrieved from the server. Typically, although not necessarily, the server is not related to the producers of the text. In a practical example, the user may be watching a standard broadcast of a baseball game, and a pitcher's name and statistics are shown at the bottom of the display. The user points to and clicks on the pitcher's name, and an OCR algorithm determines the text, which is transmitted to server 30 for retrieval therefrom of information related to the pitcher's name. Alternatively, if the text is transmitted in a separate data stream from that containing the video portion of the baseball game, then the pitcher's name may be retrieved directly from the separate data stream.

In a preferred embodiment, a first portion of the data is displayed in a first region of display 64, and a second portion of the data is displayed in a second region of display 64. Typically, a definition of the designated word, or other small quantity of data is shown in a small window, which opens adjacent to the designated word and closes automatically. A larger quantity of data, e.g., including hyperlinks and graphics, is shown in a second, fully-interactive window.

Preferably, one or more context-indicating words are drawn from the body of text and transmitted with the designated word to server 30. The server evaluates the designated word in the context of the context-indicating words, and transmits data from database 34 responsive to the evaluation. Typically, some of the context-indicating words are drawn from the same sentence as that including the designated word, to enable a grammatical analysis of the designated word, and, preferably, to sharply define the context of the designated word. For example, "stock" near "broker" is highly like to have a different meaning from "stock" near "lock" and "barrel." Therefore, server 30 would preferably retrieve information about the stock market in the first case, and information about guns in the second. Alternatively or additionally, some of the context-indicating words are drawn from elsewhere in the body of text, preferably including from a title of the body of text.

In a preferred embodiment, a context-determination algorithm runs on server 30, in order to determine the context of the designated word, as described hereinabove. For some applications, the context-determination algorithm runs on client computer 52.

To enable the algorithm, database 34 preferably comprises, in addition to the data described hereinabove, a list of keywords $k_1, k_2, \ldots, k_N$; a list of concepts $c_1, c_2, \ldots, c_M$, each with a respective a priori weight $a_1, a_2, \ldots, a_M$; and an N*M weight matrix W, typically a sparse matrix, where $W_{i,j}$, represents the strength of the relation between the keyword $k_i$ and the concept $c_j$.

The keywords may comprise words such as "Jordan," "River," "Michael," "Almond," "Kevin," "Basketball," etc., while the concepts may comprise, for example, "Jordan, kingdom of," "Jordan River," "Michael Jordan," "Kevin Jordan," "Bill Clinton," etc. The list of keywords is preferably sufficiently large so that there is a high probability that some of the keywords will appear in the body of text containing the designated word. Thus, the keywords that appear in the body of text give indications of the actual concepts embodied in the body of text, because the keywords are already linked to concepts through the matrix W. A portion of a sample matrix W is shown in Table I.

An object of the context-determination algorithm, as described in detail hereinbelow, is to process words in the body of text together with the matrix W, in order to generate an indication of the concept most closely related to the body of text. By way of example, based on the values in Table I, a body of text having the words "Michael" and "Basketball" would be most closely connected to the concept "Michael Jordan," while a body of text including "Jordan" and "Baseball" would be most closely connected to "Kevin Jordan."

TABLE I

| Concepts→<br>Keywords↓ | Jordan,<br>kingdom of | Jordan<br>River | Michael<br>Jordan | Jordan<br>Almond | Kevin<br>Jordan |
|---|---|---|---|---|---|
| Jordan | 1.0 | 0.9 | 0.9 | 0.9 | 0.9 |
| River | 0.2 | 1.0 | 0.0 | 0.0 | 0.0 |
| Michael | 0.0 | 0.0 | 0.8 | 0.0 | 0.0 |
| Almond | 0.0 | 0.0 | 0.0 | 0.9 | 0.0 |
| Kevin | 0.0 | 0.0 | 0.0 | 0.0 | 0.8 |
| Basketball | 0.0 | 0.0 | 0.6 | 0.0 | 0.0 |
| Baseball | 0.0 | 0.0 | 0.2 | 0.0 | 0.6 |
| Fruit | 0.0 | 0.0 | 0.0 | 0.4 | 0.0 |

The context-determination algorithm typically receives from client 52 a list of words from the body of text, $s_1, s_2, \ldots, s_f, \ldots, s_n$, and a number f, to indicate the position in the list of $s_f$, the designated word. A predefined "stop list" is typically maintained in database 34, comprising words such as "and," "the," "is," etc., which are expected to have no value in determining the context of the designated word. If any of the $s_i$ correspond to words in the stop list, then these are removed from the list of $s_i$ prior to further processing. The values n and f are adjusted accordingly.

Positional weights $p_1, p_2, \ldots, p_N$, are preferably assigned to all of the keywords in the database in the following manner:

$$p_i = 1.0 \text{ if } k_i = s_f$$
$$0.2 \text{ if } k_i = s_{f-1} \text{ or } k_i = s_{f+1}$$
$$0.1 \text{ if } k_i \in \{s_1, s_2, \ldots, s_{f-2}, s_{f+2}, \ldots, s_n\}$$
$$0.0 \text{ if } k_i \notin \{s_1, s_2, \ldots, s_n\}.$$

Appropriate changes to the above formula will be clear to the skilled person when $f \in \{1, 2, n-1, n\}$. It will be appreciated that the specific positional weight values cited hereinabove are cited by way of illustration only. For some applications, a broader set of parameters may be appropriate in determining the $p_i$. In particular, a quasi-continuous function $p(q)=g(s_{f-q}, f, n)$ may be implemented, q being any appropriate integer, the function generally increasing from zero to one as q approaches zero.

Additionally, special consideration may be given to particular words in or associated with the body of text, substantially regardless of their proximity to the designated word. For example, words which may be strong indicators of context include a title or section header of the body of text, or words set out by a hyperlink or by different font, size, or style from general characteristics of the body of text.

Further additionally, word analysis techniques known in the art may be applied to the $s_i$, to eliminate irrelevant grammar or other issues from affecting the context-determination algorithm. For example, "Jordan's" and "baseballs" will preferably be processed, prior to assigning positional weights, to be "Jordan" and "baseball."

A stemming algorithm, as is known in the art, is preferably applied to each of the words $s_1, s_2, \ldots, s_n$, and the positional weights are modified according to the following formula:

$$p_i = \alpha * p_j$$

if $k_i$ is a stemming of $k_j$.

The value α is typically set to 0.95, although other values of α may be appropriate in some applications.

For each concept $c_j$, a score $S(c_j)$ is preferably computed using the formula:

$$S(c_j) = a_j * \sum_{i=1}^{N} p_i * W_{i,j}$$

The scores are then sorted. The output of the algorithm is the index of the concept with the highest score, i.e., $\text{argmax}_j (S)$. Alternatively, several indices having the highest scores may be output.

Implementation of the context-determination algorithm as described has been found by the inventors to yield a high probability of determining the one or more concepts most closely related to the designated word. This can be used to particular advantage when the user designates a word having multiple contexts, such as "Clinton." Without performing a context analysis, only very general data could be returned by server 30, for example, a link to the Web page of the White House and a biography of the President. Alternatively, a word such as "Jordan" from Table I may generate completely inaccurate (not just overly general) data without context analysis as provided by the present invention. Using the context-determination algorithm as provided by embodiments of the present invention, however, if user 60 right-clicks on "Clinton" while browsing a Web page about the President's visit to the Far East, server 30 may return, for example, details of the President's trade and military policies with respect to Asian countries. Alternatively, if the words "Jefferson," "Madison," and "George" are in close proximity to the designated word "Clinton," then the server may return information about George Clinton, fourth Vice President of the United States.

As stated above, server 30 generally does not have prior access to the body of text including the designated word. Moreover, it is most preferable that embodiments of the invention be able to run properly on top of substantially any application program running in a known environment. For example, client computer 52 may be running the Windows 95, 98, or NT operating systems. Preferably, user 60 downloads client software from server 30, and the software is installed on client 52 such that right-clicking on a word in most common applications will cause a right-click pop-up menu to appear, which includes an option to retrieve information related to the word from server 30. In some embodiments, a text-grabbing algorithm, for example, as described in U.S. patent application Ser. No. 09/127,981, entitled "Computerized dictionary and thesaurus applications," which is assigned to the assignee of the present patent application and is incorporated herein by reference, and/or an optical character recognition (OCR) algorithm, are executed by the client computer to determine the word designated by the user. This word (or words, if a block of text is selected) is transmitted to server 30 for processing, as described hereinabove.

Alternatively or additionally, client 52, knowing the position indicated by pointing device 66, requests information from an application program which has displayed the word, and, responsive thereto, receives the word from the application, perhaps using an application program interface (API).

In some preferred embodiments of the present invention, server 30 establishes a community 50 of users 60, 70, and 80 having similar interests, responsive to their designated words. Typically, community 50 is enabled by server-based chat groups, e-mail lists, and/or community bulletin boards, which optionally display links to Web pages suggested by community members.

For some applications, a browser or other software running on client 52 displays text, some of which is hyperlinked to a Web site maintained by server 30 or by another server (not shown), not necessarily associated with server 30. Preferably, user 60 right-clicks on a desired hyperlink and chooses a "look-before-you-link" option from a right-click menu, to cause client computer 52 to retrieve a small amount of information from the Web page specified by the hyperlink and display the retrieved information in a transient window near the designated link. In order to achieve fast retrieval from the remote server, the displayed information typically comprises a relatively small amount of text from the designated Web page, and generally does not have any graphical components. The specific data selected for retrieval may comprise, for example, the title and first few sentences or paragraphs of the designated Web page.

Alternatively or alternatively, client 52 downloads part or all of the text from the remote server, and displays only those portions of the retrieved text having generally the same context as the paragraph containing the hyperlink clicked by the user. Context-determination is preferably performed in substantially the same manner as described hereinabove. Further alternatively or additionally, client 52 uses a summarization algorithm known in the art to analyze the retrieved text and generate a relatively small quantity of text, summarizing the retrieved text, to be displayed in the transient window. It is within the scope of the present invention to perform look-before-you-link functions either in concert with or separately from other information retrieval aspects of the present invention, described hereinabove with reference to FIG. 3.

The microfiche appendices attached hereto and incorporated herein by reference include an embodiment of the present invention in software, which is covered by copyright belonging to Guru Israel, Inc. The appendices include Guru TextGrabber software, header files, a library file, and a documentation file, which may be useful in order to build an application which practices this embodiment of the invention. Each of these files has been compressed using a "ZIP" compression program, before being listed and printed in hexadecimal format. Thus, in order to use the files contained herein, one converts these files from their printed ASCII hexadecimal representation back into the binary .zip format, using techniques known to a person who is skilled in the art. Once the files have been converted back into the binary .zip format, they may be uncompressed using any suitable "ZIP" compression utility, such as WinZip, available from Nico Mak Computing, Inc., (Mansfield, Conn.).

After being uncompressed, the converted files should be named according to the name designated in each appendix. The file agtsdk.doc contains instructions explaining how the header files (with the extension .h) and the library file (with the extension .lib) should be used in order to compile, link and run an application that uses the Guru TextGrabber software.

It will be understood by one skilled in the art that aspects of the present invention described hereinabove can be embodied in a computer running software, and that the software can be stored in tangible media, e.g., hard disks, floppy disks or compact disks, or in intangible media, e.g., in an electronic memory, or on a network such as the Internet.

It will be appreciated that the individual preferred embodiments described above are cited by way of example, and that specific applications of the present invention may employ only a portion of the features described hereinabove, or a combination of features described with reference to a plurality of the figures. The full scope of the invention is limited only by the claims.

What is claimed is:

1. A method for providing information, comprising:
    contracting with one or more advertisers having respective fields of business to provide promotional data to users of a network regarding the fields of business;
    receiving from a host via the network at least one word designated by one of the users, the word being in a natural language in a body of text shown on a display of the host and transmitted by the host automatically responsive to the designation;
    determining that the at least one designated word relates to a given one of the fields of business; and
    transmitting to the host the promotional data regarding the given field of business.

2. A method according to claim 1, wherein receiving the at least one designated word from the host comprises receiving by a server which does not store the body of text.

3. A method according to claim 1, wherein the at least one designated word does not have a hyperlink directly associated therewith.

4. A method according to claim 1, wherein the promotional data comprise electronic commerce data, selected responsive to the at least one designated word.

5. A method according to claim 1, wherein the display shows a television program, and wherein the body of text is generated responsive to content of the program.

6. A method according to claim 1, wherein the promotional data comprise dynamic data, drawn from a dynamically-changing database responsive to the at least one designated word.

7. A method according to claim 1, wherein the at least one word is designated with a pointing device.

8. A method according to claim 1, and comprising receiving from the host a context-indicating word, drawn from the body of text, wherein transmitting promotional data to the host data comprises transmitting responsive to the context-indicating word.

9. A method according to claim 8, wherein the context-indicating word is drawn from a position in the body of text non-adjacent to the at least one designated word.

10. A method according to claim 8, wherein the context-indicating word is drawn from a different sentence in the body of text from a sentence including the at least one designated word.

* * * * *